United States Patent [19]

Min et al.

[11] Patent Number: 5,698,009
[45] Date of Patent: Dec. 16, 1997

[54] METHOD FOR AGGLOMERATING PRE-REDUCED HOT IRON ORE PARTICLES TO PRODUCE INGOT IRON

[75] Inventors: Dong Joon Min; Yoon Chul Park, both of Pohang, Rep. of Korea

[73] Assignees: Pohang Iron & Steel Co., Ltd.; Research Institute of Industrial Science & Technology, both of Pohang, Rep. of Korea; Voest-Alpine Industrieanlagenbau GmbH, Linz, Austria

[21] Appl. No.: 577,254

[22] Filed: Dec. 22, 1995

[30] Foreign Application Priority Data

Dec. 26, 1994 [KR] Rep. of Korea ............... 1994-36823

[51] Int. Cl.$^6$ ............................................. C22B 1/16
[52] U.S. Cl. .............................. 75/436; 75/315; 75/751
[58] Field of Search .................. 75/315, 316, 319, 75/500, 436, 751

[56] References Cited

U.S. PATENT DOCUMENTS 4,978,387 12/1990 Kepplinger .

5,397,379 3/1995 Barker et al. .................. 75/303

FOREIGN PATENT DOCUMENTS 4932684 9/1974 Japan ........................ 75/315

*Primary Examiner*—Melvyn Andrews
*Attorney, Agent, or Firm*—Webb Ziesenheim Bruening Lodgson Orkin & Hanson, P.C.

[57] ABSTRACT

A method for agglomerating iron ore particles pre-reduced to produce hot pig iron, wherein hot iron ore particles pre-reduced in the pre-reduction furnace are simply mixed with aluminum powder or aluminum-containing metal powder before being loaded in the smelting reduction furnace so that they will be agglomerated, thereby being capable of not only simplifying the agglomeration, but also eliminating the adverse effect on the quality of ingot iron caused by impurities such as S or P. Aluminum dross, which is a waste, may be used as the aluminum-containing metal powder for agglomerating the iron ore particles. In this case, a reduced energy consumption and disposal of wastes can be achieved.

17 Claims, 3 Drawing Sheets

1

METHOD FOR AGGLOMERATING PRE-REDUCED HOT IRON ORE PARTICLES TO PRODUCE INGOT IRON

BACKGROUND OF THE INVENTION

1. Field of the Invention

The present invention relates to a method for agglomerating iron ore particles in the smelting reduction process, and more particularly to a method for agglomerating iron ore particles pre-reduced in the smelting reduction process for producing pig iron (ingot iron).

2. Description of the Prior Art

Up to now, the production of pig iron has been achieved mainly using blast furnaces. However, it has been gradually limited to implement this method because of the shortage of high quality coal, which has a high binding property and is a source of coke used as a fuel and reducing agent, the shortage of coke caused by the increased use thereof, the demand on the reduction of $CO_2$ gas causing the earth to warm, and the increased restriction for $SO_x$ and $NO_x$ generated in the coke production procedure or in sintering factories.

Furthermore, the method using the blast furnace requires a pre-treatment such as sintering or pelletizing because the raw material should be used after being treated to have a large grain size in order to ensure the ventilation of the furnace and to prevent the re-formation of dust in the furnace. Moreover, a large amount of energy is consumed upon sintering the raw material.

In order to solve the above-mentioned problems involved in the method using the blast furnace, U.S. Pat. No. 4,978,387 has proposed a smelting reduction process wherein particles of the raw material are directly reduced in a fluidized bed type or fluidized bubble bed type reducing furnace without being pre-treated, and are finally reduced and melted in a smelting reduction furnace.

That is, U.S. Pat. No. 4,978,387 discloses a method for feeding ores pre-reduced in the pre-reduction furnace to the smelting reduction furnace using a carrier gas. Where particles of the raw material are charged in the smelting reduction furnace using the carrier gas, dust is formed by gas generated in the smelting reduction furnace as well as the carrier gas, thereby resulting in a loss of raw material. Furthermore, additional heat is required to heat the carrier gas of the atmospheric temperature, thereby increasing the total energy consumption. When dust is generated by the carrier gas, it may enter the pre-reduction furnace together with the carrier gas. In this case, the dust may plug the dispersing plate of the pre-reduction furnace or may be attached to the inner wall of the furnace at the fluidized bed. As a result, the dust hinders the operation of the furnace or results in an increased operation time.

Methods for agglomerating particles of the raw material have been proposed to prevent the raw material from forming dust in the smelting reduction procedure.

These methods basically use an oxide-based compound, such as cement or bentonite, requiring the addition of moisture as a binder. In other words, the raw material is mixed with the binder while being added with moisture at the atmospheric temperature, dried and then charged in the furnace after being cooled. As a result, the overall procedure is complex. There is also a problem of an increased energy consumption. The compound used as the binder for agglomerating the particles may have an adverse effect on the quality of the finally obtained pig iron or ingot iron because it requires heating energy and may contain impurities such as sulfur (S) or phosphor (P).

In order to solve the above-mentioned problems encountered in the conventional methods, the inventors conducted research and experiments, then proposed the present invention based on the results of the research and experiments.

SUMMARY OF THE INVENTION

Therefore, an object of the invention is to provide a method for agglomerating iron ore particles pre-reduced to produce hot pig iron, wherein hot iron ore particles pre-reduced in the pre-reduction furnace are simply mixed with aluminum powder or aluminum-containing metal powder before being loaded in the smelting reduction furnace so that they will be agglomerated, thereby being capable of not only simplifying the agglomeration, but also eliminating the adverse effect on the quality of ingot iron caused by impurities such as S or P.

Another object of the invention is to provide a method for agglomerating iron ore particles pre-reduced to produce hot pig iron, wherein aluminum dross, which is a waste, is used as aluminum-containing metal powder for agglomerating the iron ore particles, thereby enabling a reduced energy consumption and a disposal of wastes.

In accordance with the present invention, these objects are accomplished by providing in the production of ingot irons comprising charging hot iron ore particles pre-reduced in a pre-reduction furnace into a smelting reduction furnace, a method for agglomerating the iron ore particles, comprising the step of: mixing binder powder selected from a group consisting of aluminum powder and aluminum-containing powder with the iron ore particles before the iron ore particles are charged into the smelting reduction furnace, thereby agglomerating the iron ore particles.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
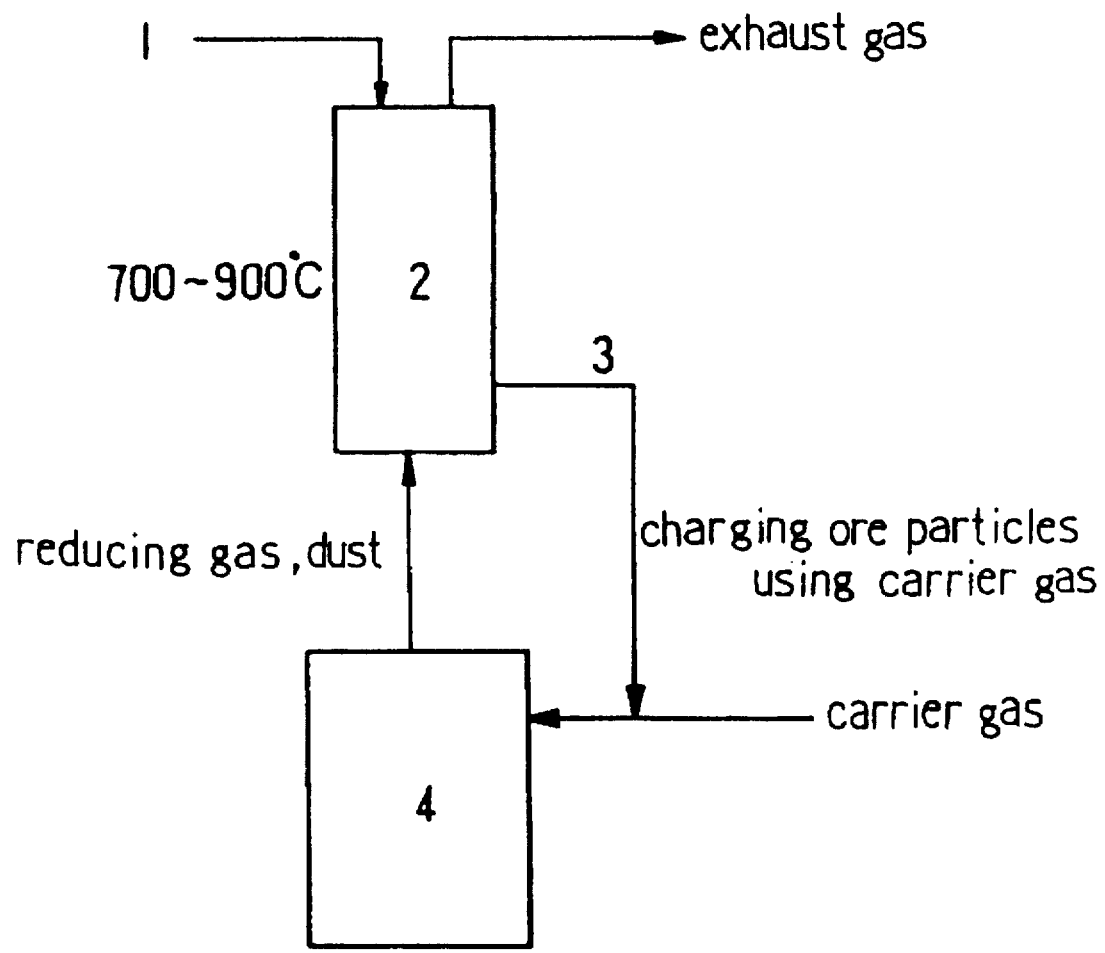
FIG. 1 is a flow diagram illustrating a conventional smelting reduction process.

Referring to FIG. 1, a conventional smelting reduction process is illustrated. In accordance with this process, particles of iron ore 1 are pre-reduced in a pre-reduction furnace 2, as shown in FIG. 1. The pre-reduced iron ore particles, which are denoted by the reference numeral 3, are charged in a smelting reduction furnace 4 along with a carrier gas so as to produce hot pig iron. In this case, however, there is a problem that since the ore particles loaded in the smelting reduction furnace have a small particle size, fine ones thereof are dispersed from the gas flow in the smelting reduction furnace 4.

Figure 2:
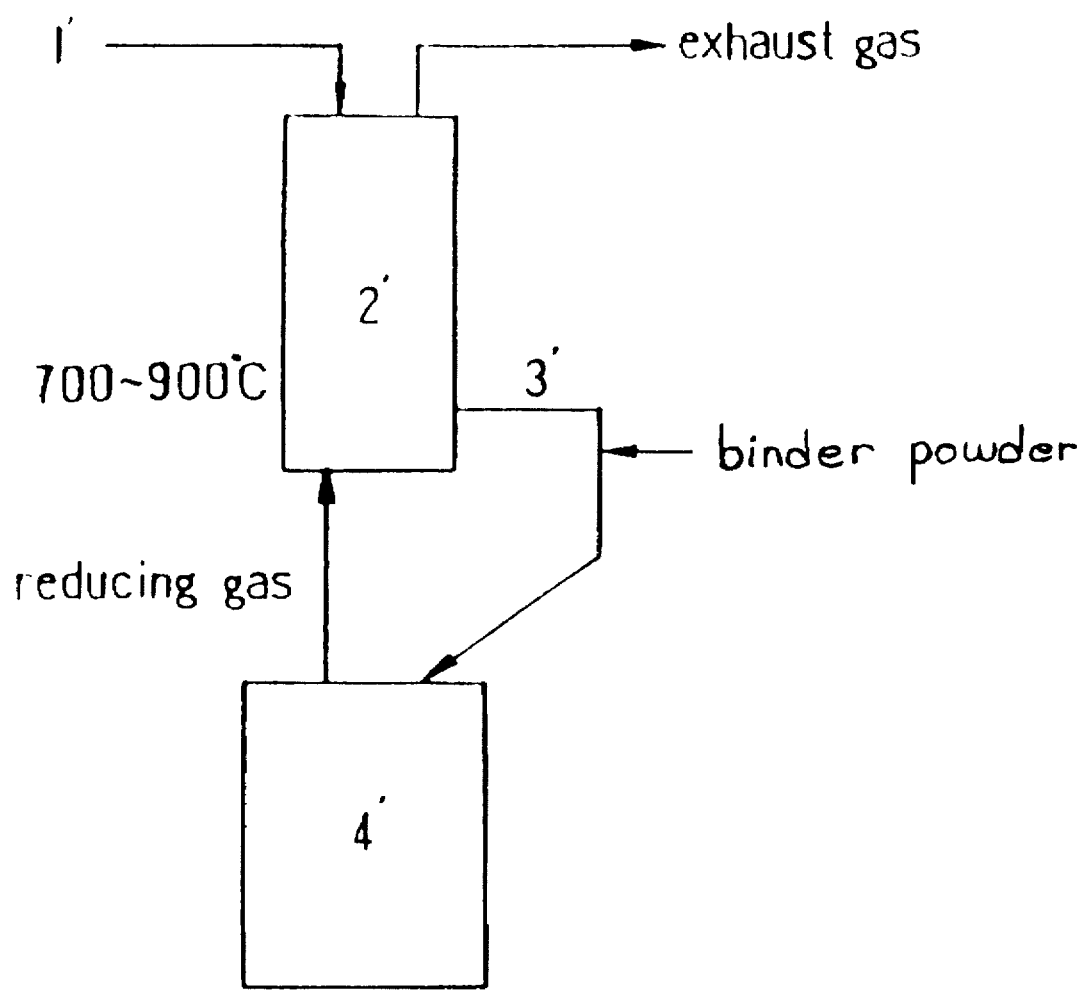
FIG. 2 is a flow diagram illustrating a smelting reduction process using an agglomeration method according to the present invention.

FIG. 2 illustrates a smelting reduction process according to the present invention. In accordance with this process, ore particles 1' pre-reduced in a pre-reduction furnace 2' is simply mixed with binder powder selected from the group consisting of aluminum powder and aluminum-containing powder before it is charged in a smelting reduction furnace 4'. In this case, the ore particles are agglomerated so that they will not be dispersed in the smelting reduction furnace.

The agglomeration of ore particles according to the present invention will now be described in detail.

Basically, the smelting reduction process for ore particles involves a pre-reduction for the ore particles at a temperature of about 700° C. or above. The pre-reduction is carried out in a reducing atmosphere consisting of hydrogen or carbon monoxide. In this regard, it is possible to agglomerate iron ore particles by simply mixing a binder comprised of aluminum powder or aluminum-containing powder with iron ore particles. Since the aluminum of the binder is a fusible metal having a low melting point of 600° C., it is melted by the hot iron ore particles and adheres to the particles, thereby agglomerating the particles.

It is preferred that the aluminum-containing powder have a melting point of not higher than the pre-reducing temperature of the iron ore particles. As the aluminum-containing powder, Al—Mg alloy powder or Al—Li alloy powder may be used.

When binder powder, which is selected from the group consisting of Al powder and Al-containing powder, is mixed with iron ore particles, its preferable amount is determined such that the weight of aluminum provided by the binder powder is at least 8 Kg per 1 ton of the iron ore particles. More preferably, the mixed amount of the binder powder is determined such that the weight of aluminum is 12 to 25 Kg per 1 ton of the iron ore particles.

It is preferred that the binder powder have a grain size of not larger than 8 mm. More preferably, the binder powder will have a grain size of not larger than 5 mm.

Preferably, the mixture of the iron ore particles and binder powder is maintained as it is for at least 10 seconds after the mixing so that aluminum can be sufficiently melted. It is more preferable that the maintenance time of the mixture be 30 seconds to 5 minutes.

The maintenance time of the mixture can be appropriately determined, taking into consideration the grain size of the binder powder and the temperature of the pre-reduced iron ore particles both associated with the melting of the binder powder.

The maintenance of the mixture for a desired time after the mixing can be achieved by installing a storage vessel for storing the pre-reduced hot iron ore particles between the pre-reduction furnace and the smelting reduction furnace.

Aluminum dross is a desirable Al-containing powder as the binder powder according to the present invention. Such aluminum dross is available from aluminum working factories. Now, the following description will be made in conjunction with the aluminum dross.

Typically, aluminum dross is waste produced in the manufacture of aluminum products in aluminum working factories. After being collected, such aluminum dross is buried for its disposal because there is no longer any utility thereof. However, the aluminum dross is a fusible metal having a low melting point and contains a large amount of aluminum or aluminum oxide (for example, $Al_2O_3$) exhibiting a strong reducing ability. Although such aluminum dross also contains other elements including $K_2O$, $Na_2O$, CaO, MgO, $Si_2O$, FeO, C and etc., it hardly contains phosphor or sulfur having an adverse effect on the quality of ingot iron. By virtue of such a composition, aluminum contained in the aluminum dross can be used as a reducing agent and fuel for iron ores loaded in the smelting reduction furnace because the aluminum dross melts at a low temperature and has no adverse effect on the iron ores even when added in the smelting reduction furnace. Where the agglomeration of pre-reduced iron ore particles is carried out using, as a binder for the iron ore particles, aluminum dross which contains no impurities, but contains aluminum having a low melting point and high caloric value, it is possible to easily load the iron ores. Moreover, there is an advantage in terms of the reduction in energy consumption required in the overall procedure as well as the disposal of waste because the aluminum contained in the aluminum dross can be used as part of the fuel for the smelting reduction process. Thus, the aluminum dross can be desirably used as the binder powder according to the present invention.

Where aluminum dross is used as the Al-containing powder according to the present invention, oxides contained in the aluminum dross are kept in a solid phase at a temperature ranging from about 600° to 1,200° C. because they have a melting point of at least 1,200° C. Accordingly, after aluminum contained in the aluminum is melted, such oxides are mixed with the molten aluminum, along with other elements which are contained in the aluminum dross and kept in the solid phase. As a result, the viscosity of the molten aluminum is increased, thereby enhancing the bonding force among ore particles. Part of the aluminum melted among the ore particles and serving as the binder forms $Al_2O_3$, which is an oxide having a high melting point, during the agglomeration procedure carried out in an oxide atmosphere, thereby greatly enhancing the bonding force of the ore particles. After the agglomeration procedure, the residual aluminum dross forms alumina which is a slag element ($CaO—SiO_2—AlO_3$) produced in the smelting reduction furnace. Since this residual aluminum dross can be easily discharged, as slag, out of the smelting reduction furnace, the aluminum dross can be used as a binder which does not contain any impurities adversely affecting the quality of products or does not cause a loss of energy.

For example, aluminum contained in the aluminum dross used as the binder generates heat of 7,467 Kcal/Kg-Al when it carries out an oxidizing reaction in the smelting reduction furnace, as shown in Table 1. This caloric value is approximately equal to the maximum caloric value of typical coal ranging from 6,000 to 7,000 Kcal/Kg-coal as shown in Table 1. Where the aluminum dross is charged as a binder in the smelting reduction furnace, along with ore particles, accordingly, it is possible to reduce the consumption of coal at least by the amount of aluminum contained in the aluminum dross. It is also possible to reduce the generation of gas.

TABLE 1

| Raw Material | Exothermic Reaction | Ma. caloric Value (kcal/kg) | Reaction Product |
|---|---|---|---|
| Al in dross | $2Al + \frac{3}{2}O_2 = Al_2O_3$ | 7467 | slag elements |
| Coal A | $C + O_2 = CO_2$<br>$H_2 + \frac{1}{2}O_2 = H_2O$ | 7300 | gas |
| Coal B | $C + O_2 = CO_2$<br>$H_2 + \frac{1}{2}O_2 = H_2O$ | 7120 | gas |
| Coal C | $C + O_2 = CO_2$<br>$H_2 + \frac{1}{2}O_2 = H_2O$ | 6740 | gas |

As the aluminum dross containing a fusible metal, namely, aluminum and being used as the binder for agglomerating particles of a raw material, namely, making the raw material have an increased particle size, those having a large aluminum content is preferred. This is because the aluminum, which is the sole fusible one among elements contained in the aluminum dross, can be melted to wet and bond particles of the raw material. If aluminum dross has too low an aluminum content, then the total amount thereof increases so as to supply the minimum amount of aluminum for the agglomeration of the particles. In this case, the bonding force of particles is lowered.

In this regard, it is preferable to use aluminum dross containing Al in an amount of 5 to 60 wt % and $Al_2O_3$ in an amount of not more than 40 wt %.

Where the aluminum dross having the above-mentioned composition is used, its preferable amount is at least 30 Kg per 1 ton of iron ore particles. More preferably, the amount of the aluminum ranges from 50 to 100 Kg per 1 ton of iron ore particles.

With aluminum dross in an amount of less than 30 Kg per 1 ton of iron ore particles, the agglomeration of the iron ore particles is hardly achieved. In this case, there is a possibility that iron ore particles bonded together may be released from one another because of their weak bonding force. Where aluminum dross is used in an amount of more than 100 Kg, the viscosity of slag produced in the smelting reduction furnace is unfavorably increased causing a difficulty in the separation between the slag and hot pig iron.

It is preferred that the aluminum dross have a grain size of not larger than 8.0 mm. More preferably, the aluminum dross has a grain size of not larger than 5.0 mm.

As the binder according to the present invention, Al chips or Al scraps produced in Al working factories may also be preferably used.

The present invention will be understood more readily with reference to the following example and comparative example; however these examples are intended to illustrate the invention and are not to be construed to limit the scope of the present invention.

EXAMPLE

Various kinds of aluminum dross respectively having different compositions as shown in Table 2 were prepared, along with various kinds of pre-reduced iron ore particles respectively having different compositions, but all essentially consisting of $Fe_2O_3$, FeO and Fe. Each kind of prepared aluminum dross was mechanically mixed with each kind of pre-reduced iron ore particles after being measured. Thus, various kinds of mixture samples were prepared.

For each mixture sample, the mixed amount of the aluminum dross was 100 Kg per 1 ton of the iron ore particles. The aluminum dross had a grain size of not larger than 5 mm. The iron ore particles also had a grain size of not larger than 5 mm.

Figure 3:
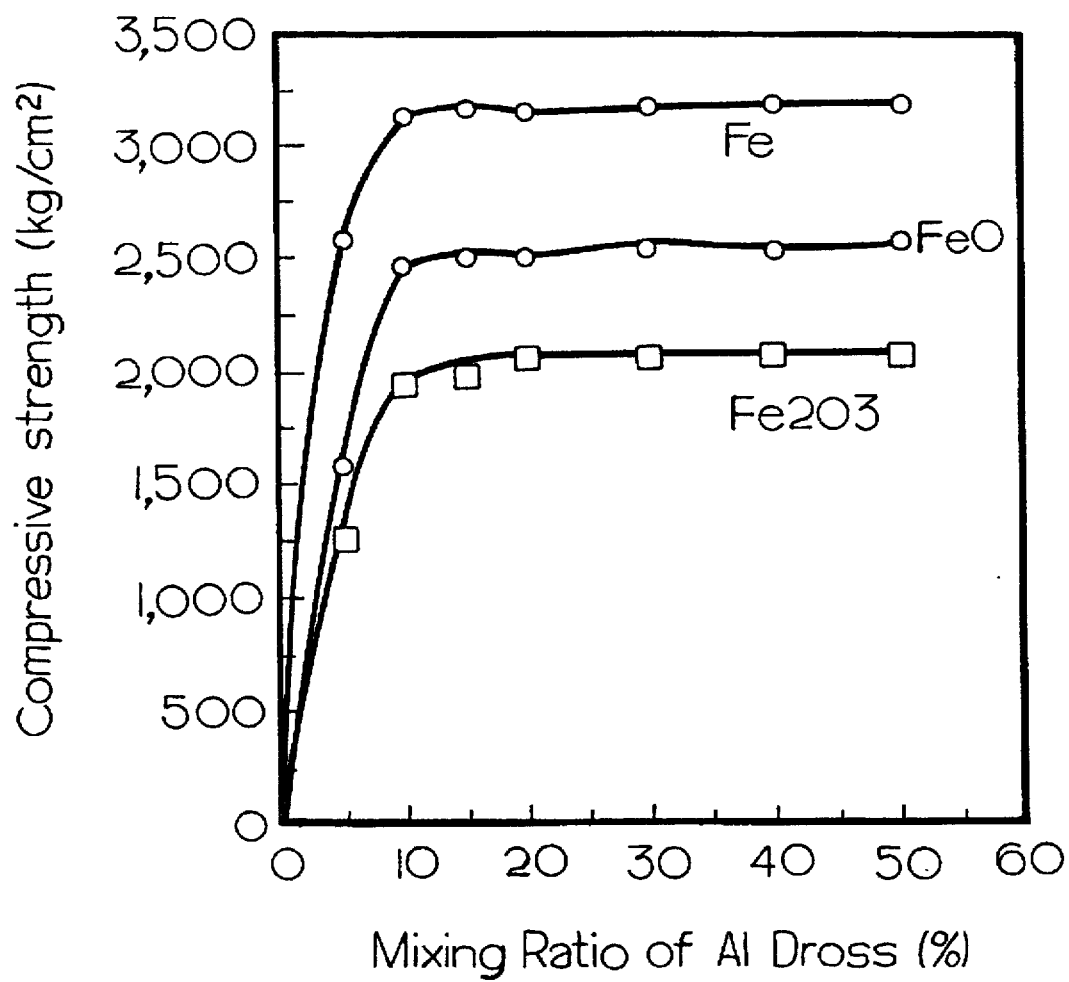
FIG. 3 is a graph illustrating a variation in compressive strength of agglomerated ore depending on the mixing ratio of aluminum dross.

20 g of each mixture sample prepared as above was loaded in an MgO crucible and then heated to 800° C., that is, a pre-reduction temperature in the smelting reduction procedure. At this temperature, the mixture sample was kept for about 2 minutes to agglomerate the iron ore particles. Thereafter, the compressive strength of the agglomerated iron ore particles was measured for each sample. The result is described in Table 3 and depicted in FIG. 3.

Comparative Example

Without mixing with any aluminum dross, the same kinds of pre-reduced iron ore particles as those prepared in Example 1 were agglomerated using a high temperature mechanical agglomeration process. Thereafter, the compressive strength of the agglomerated iron ore particles was measured for each iron ore sample. The result is described in Table 3.

TABLE 2

| Al Dross | Composition | | | | | | | | |
|---|---|---|---|---|---|---|---|---|---|
| | $K_2O$ | $Na_2O$ | CaO | Al | $Al_2O_3$ | $SiO_2$ | T.Fe | C | Others |
| Drross A | 0.6 | 1.8 | 8.9 | 52.9 | 12.2 | 7.1 | 2.9 | 2.9 | Balance |
| Drross B | 0.6 | 3.3 | 7.8 | 27.2 | 38.1 | 11.8 | 1.5 | 1.2 | Balance |
| Drross C | 3.9 | 4.4 | 11.4 | 25.3 | 32.6 | 1.8 | 0.6 | 1.2 | Balance |

TABLE 3

| | Compressive Strength ($kg/cm^2$) | |
|---|---|---|
| | Present Method | High Temp. Mechanical Agglomeration Method |
| Sample A | | |
| $Fe_2O_3$ | 2235 | 128 |
| FeO | 2832 | 223 |
| Fe | 3126 | 2982 |
| Sample B | | |
| $Fe_2O_3$ | 2130 | 128 |
| FeO | 2602 | 223 |
| Fe | 3212 | 2982 |
| Sample C | | |
| $Fe_2O_3$ | 1931 | 128 |
| FeO | 2468 | 223 |
| Fe | 3010 | 2982 |

Referring to Table 3, it can be found that the agglomerated samples according to the present invention exhibit a higher compressive strength than those produced using the high temperature mechanical agglomeration process which is one of conventional agglomeration methods. In particular, all the samples of the present invention have a uniform and high compressive strength without being affected by the pre-reduction rate of iron ore. Although the mechanical agglomeration process can obtain a satisfactory compressive strength only for iron ores having a pre-reduction rate of at least about 50%, the method of the present invention can obtain a high compressive strength irrespective of the pre-reduction rate of iron ores.

Referring to Table 3, it can also be found that when aluminum dross having a higher aluminum content is used (sample A), a higher compressive strength is obtained. This can also be apparent from FIG. 3.

Since the pre-reduced iron ore particles are effectively agglomerated by the aluminum dross, they can be gravitationally loaded in the smelting reduction furnace. In this regard, the present invention provides many advantages of a reduced generation of dust, a reduced consumption of energy and disposal of wastes only by simply supplying aluminum dross to the iron ore particle supply line such that it is mixed with the iron ore particles in the supply line.

As apparent from the above description, the method of the present invention enables the agglomeration of iron ore particles only by simply mixing Al powder or Al-containing powder with the iron ore particles pre-reduced in the smelting reduction process. Accordingly, the method of the present invention does not require any additional processing step or equipment, thereby enabling an inexpensive charging of iron ore particles. Where aluminum dross is used as the Al-containing powder according to the present invention, a reduced energy consumption can be achieved because the aluminum dross, which is a waste, can be used as an energy source.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of agglomerating pre-reduced iron ore particles for use in a pig iron production process employing a pre-reduction furnace and a smelting reduction furnace, the agglomerating method comprising the steps of:

providing hot, pre-reduced iron ore particles from the pre-reduction furnace;

providing a binder powder selected from the group consisting of aluminum powder and aluminum-containing powder;

mixing the hot, pre-reduced iron ore particles and the binder powder to provide a mixture of binder powder and iron ore particles; and melting the aluminum in said binder powder by virtue of a latent heat possessed by said hot, pre-reduced iron ore particles whereby the melted aluminum wets and bonds said particles thereby producing agglomerated iron ore particles prior to charging said agglomerated iron ore particles into the smelting reduction furnace.

2. The method in accordance with claim 1, wherein the amount of the binder powder mixed with the iron ore particles is determined such that the weight of aluminum provided by the binder powder is at least 8 Kg per 1 metric ton of the iron ore particles.

3. The method in accordance with claim 1, wherein the amount of the binder powder mixed with the iron ore particles is determined such that the weight of aluminum provided by the binder powder is 12 to 25 Kg per 1 metric ton of the iron ore particles.

4. The method in accordance with claim 1, wherein the binder powder has a grain size of not larger than 8 mm.

5. The method in accordance with claim 1, further comprising the step of maintaining the mixture of binder powder and iron ore particles for at least 10 seconds after they are mixed together prior to charging into the smelting reduction furnace.

6. The method in accordance with claim 4, further comprising the step of maintaining the mixture of binder powder and iron ore particles for at least 10 seconds after they are mixed together prior to charging into the smelting reduction furnace.

7. The method in accordance with claim 1, wherein the binder powder is one selected from a group consisting of aluminum chip, aluminum scrap, Al—Mg alloy powder and Al—Li alloy powder.

8. The method in accordance with claim 4, wherein the binder powder is one selected from a group consisting of aluminum chip, aluminum scrap, Al—Mg alloy powder and Al—Li alloy powder.

9. The method in accordance with claim 5, wherein the binder powder is one selected from a group consisting of aluminum chip, aluminum scrap, Al—Mg alloy powder and Al—Li alloy powder.

10. The method in accordance with claim 6, wherein the binder powder is one selected from a group consisting of aluminum chip, aluminum scrap, Al—Mg alloy powder and Al—Li alloy powder.

11. The method in accordance with claim 1, wherein the binder powder is an aluminum dross.

12. The method in accordance with claim 11, wherein the aluminum dross containing Al in an amount of 5 to 60 wt % and $Al_2O_3$ in an amount of not more than 40 wt %.

13. The method in accordance with claim 12, wherein the amount of the aluminum dross mixed with the iron ore particles is at least 30 Kg per 1 metric ton of the iron ore particles.

14. The method in accordance with claim 12, wherein the amount of the aluminum dross mixed with the iron ore particles is 50 to 100 Kg per 1 metric ton of the iron ore particles.

15. The method in accordance with claim 11, further comprising the step of maintaining the mixture of aluminum dross and iron ore particles for at least 10 seconds after they are mixed together prior to charging into the smelting reduction furnace.

16. The method in accordance with claim 11, wherein the aluminum dross has a grain size of not larger than 8 mm.

17. The method in accordance with claim 15, wherein the aluminum dross has a grain size of not larger than 8 mm.

* * * * *